US012367830B2

(12) United States Patent
Bae et al.

(10) Patent No.: US 12,367,830 B2

(45) Date of Patent: Jul. 22, 2025

(54) COMPENSATION PIXEL CIRCUIT OF ACTIVE MATRIX ORGANIC LIGHT-EMITTING DIODE

(71) Applicant: Hoseo University Academic Cooperation Foundation, Asan-si (KR)

(72) Inventors: Byung Seong Bae, Suwon-si (KR); Hyuck Su Lee, Incheon (KR); Seo Jin Kang, Siheung-si (KR)

(73) Assignee: HOSEO UNIVERSITY ACADEMIC COOPERATION FOUNDATION, Asan-si (KR)

( * ) Notice: Subject to any disclaimer, the term of this patent is extended or adjusted under 35 U.S.C. 154(b) by 0 days.

(21) Appl. No.: 18/621,489

(22) Filed: Mar. 29, 2024

(65) Prior Publication Data

US 2024/0428733 A1 Dec. 26, 2024

Related U.S. Application Data

(63) Continuation of application No. PCT/KR2022/014085, filed on Sep. 21, 2022.

(30) Foreign Application Priority Data

Sep. 29, 2021 (KR) ........................ 10-2021-0128918

(51) Int. Cl.

*G09G 3/3233* (2016.01)
*G09G 3/00* (2006.01)

(52) U.S. Cl.

CPC ........... *G09G 3/3233* (2013.01); *G09G 3/035* (2020.08); *G09G 2300/0852* (2013.01); *G09G 2310/08* (2013.01); *G09G 2320/0223* (2013.01); *G09G 2320/0233* (2013.01)

(58) Field of Classification Search

None

See application file for complete search history.

(56) References Cited

U.S. PATENT DOCUMENTS

| | | | | |
|---|---|---|---|---|
| 2009/0115707 A1* | 5/2009 | Park | G09G 3/3291 345/76 |
| 2021/0158734 A1* | 5/2021 | Kim | H01L 25/162 |

FOREIGN PATENT DOCUMENTS

| | | | |
|---|---|---|---|
| KR | 102009748 B1 * | 8/2019 | |

* cited by examiner

*Primary Examiner* — Nicholas J Lee

(74) *Attorney, Agent, or Firm* — LEX IP MEISTER, PLLC

(57) ABSTRACT

An active-matrix organic light-emitting diode (AMOLED) compensation pixel circuit is provided.

The pixel circuit is configured to include an OLED element, three switching transistors, one driving transistor, and two capacitors. This configuration allows the voltage applied to the gate of the driving transistor to change in proportion to the area of the display screen, thereby increasing the current flowing through the OLED. This enables compensation for luminance reduction while also automatically compensating for luminance reduction caused by power supply voltage drops.

11 Claims, 12 Drawing Sheets

COMPENSATION PIXEL CIRCUIT OF ACTIVE MATRIX ORGANIC LIGHT-EMITTING DIODE

BACKGROUND OF THE INVENTION

1. Field of the Invention

The present invention relates to an active matrix organic light emitting diode (AMOLED) compensation pixel circuit, and more particularly, to an AMOLED compensation pixel circuit capable of compensating for luminance variations caused not only by area changes due to substrate stretching but also by voltage drops resulting from increased resistance as wiring lengths increase.

2. Description of the Related Art

FIG. 1A is a diagram illustrating a conventional active matrix organic light-emitting diode (AMOLED) pixel circuit display panel, and FIG. 1B is a diagram illustrating the resistance of the conventional AMOLED pixel circuit display panel.

Among the various forms of display device transformation, stretchable display technology, which allows for variable panel area through elasticity, is gaining increasing attention the as most advanced display transformation technology.

However, when the area of a display panel incorporating stretchable technology changes, the area of the electrode wiring within the panel or connected to the driving circuit also changes. Consequently, not only does the resistance and capacitance of the electrode wiring constituting the panel increase, but also electrical characteristics such as the threshold voltage and electron mobility of the thin-film transistors within the pixels can change. Moreover, changes in the display panel area can lead to voltage drops in the voltage supplied to the AMOLEDs constituting the panel, potentially causing changes in current. As a result, stretchable displays have faced the problem of luminance imbalance occurring when the area of the stretchable display panel changes.

In other words, referring to FIGS. 1A and 1B, when the display is stretched, the bus line of the AMOLED becomes longer, leading to increased resistance and, consequently, increased I-R drop. As the VDD voltage drops due to the I-R drop, the current flowing into the AMOLED decreases, resulting in luminance non-uniformity in the AMOLED display.

Alternatively, as methods for constructing a stretchable display, it is possible to avoid changes in transistor characteristics by configuring transistor devices in rigid, non-stretchable areas, or to reduce the change in wiring resistance due to stretching by using horseshoe-shaped or curved wiring structures. However, even if the change in OLED current is minimal or non-existent due to these methods, the average luminance still decreases as the area increases.

Therefore, there is a need for a compensation circuit configuration that can compensate for luminance non-uniformity that occurs when the area changes in a large-area display substrate using flexible or stretchable materials. In other words, a circuit configuration is needed that can compensate for luminance changes and imbalances that occur when the area changes in a stretchable display.

SUMMARY OF THE INVENTION

The present invention has been devised to address the aforementioned problems. By configuring a pixel circuit comprising an organic light-emitting diode (OLED) element, three switching transistors, one driving transistor, and two capacitors, the present invention aims to provide an active matrix organic light-emitting diode (AMOLED) compensation pixel circuit capable of automatically compensating for luminance degradation caused not only by deterioration of transistor device characteristics due to an increase in display screen area but also by an increase in wiring resistance.

Furthermore, another objective of the present invention is to provide an AMOLED compensation pixel circuit capable of compensating for the anode current by compensating for the threshold voltage and voltage drop of the driving transistor, and consequently compensating for the luminance of the AMOLED display panel.

To accomplish this objective, there is provided an active matrix organic light-emitting diode (AMOLED) compensation pixel circuit, comprising: a power line for a power voltage; an organic light-emitting diode element that emits light with a predetermined luminance by a supplied current; a driving transistor, to which the power voltage is applied to a drain electrode through the power line, and wherein a current supplied by the applied power voltage is transmitted to a source electrode to deliver the current to the organic light-emitting diode element; a first scan signal line that serves as a signal line for a scan signal; a second scan signal line that serves as a signal line for another scan signal; a data line that provides a data voltage for light emission of the organic light-emitting diode element; a first switching transistor, whose gate electrode is connected to the first scan signal line, and whose drain electrode is connected to the data line; a first capacitor connected between the gate electrode and the drain electrode of the driving transistor; a second switching transistor, whose gate electrode is connected to the first scan signal line together with the gate electrode of the first switching transistor; a third switching transistor, whose source electrode is connected to the source electrode of the second switching transistor, and whose gate electrode and drain electrode are connected to each other to function as a diode, allowing a unidirectional current to flow; and a second capacitor connected between a node (hereinafter, referred to as 'Node P') connected to a source electrode of the first switching transistor, a gate electrode of the driving transistor, and the first capacitor, and a node (hereinafter, referred to as 'Node Q') connected to the source electrode of the second switching transistor and the source electrode of a third switching transistor.

According to the present invention, by configuring a pixel circuit comprising an organic light-emitting diode (OLED) element, three switching transistors, one driving transistor, and two capacitors, the voltage applied to the gate of the driving transistor changes in proportion to the area of the display screen, thereby increasing the current flowing through the OLED. This enables compensation for luminance degradation caused by stretching while also automatically compensating for luminance degradation caused by voltage drops in the power supply.

Furthermore, the present invention can be usefully applied to future display applications such as biomedical, automotive, Internet of Things (IoT), and wearable electronic devices. When a stretchable display is attached to the body or used as a window curtain, for example, and partial stretching causes luminance changes, the present invention can compensate for these changes, enabling the implementation of a stretchable display with uniform luminance even when the area increases. Additionally, it can compensate for luminance changes caused by voltage drops due to wiring resistance.

DETAILED DESCRIPTION OF THE INVENTION

The present invention may be embodied in various other forms without departing from the spirit or essential characteristics thereof. Therefore, the embodiments of the present invention are to be considered in all respects as illustrative and not restrictive.

The terms "first," "second," and the like may be used to describe various components, but the components should not be limited by these terms. These terms are used solely for the purpose of distinguishing one component from another. For example, without departing from the scope of the present invention, the first component may be termed the second component, and similarly, the second component may be termed the first component.

When a component is described as being "connected" or "coupled" to another component, it should be understood that the connection or coupling may be direct or indirect, with other components intervening. On the other hand, when a component is described as being "directly connected" or "directly coupled" to another component, it should be understood that there are no intervening components.

The terminology used in this application is for the purpose of describing particular embodiments only and is not intended to limit the invention. Unless the context clearly indicates otherwise, singular expressions include plural expressions. In this application, the terms "comprising," "including," "having," and the like are intended to specify the presence of stated features, numbers, steps, operations, elements, components, or combinations thereof, and do not preclude the presence or addition of one or more other features, numbers, steps, operations, elements, components, or combinations thereof.

Hereinafter, the most preferred embodiments of the present invention will be described in detail with reference to the accompanying drawings so that those skilled in the art to which the present invention pertains can readily implement the invention.

Figure 1A:
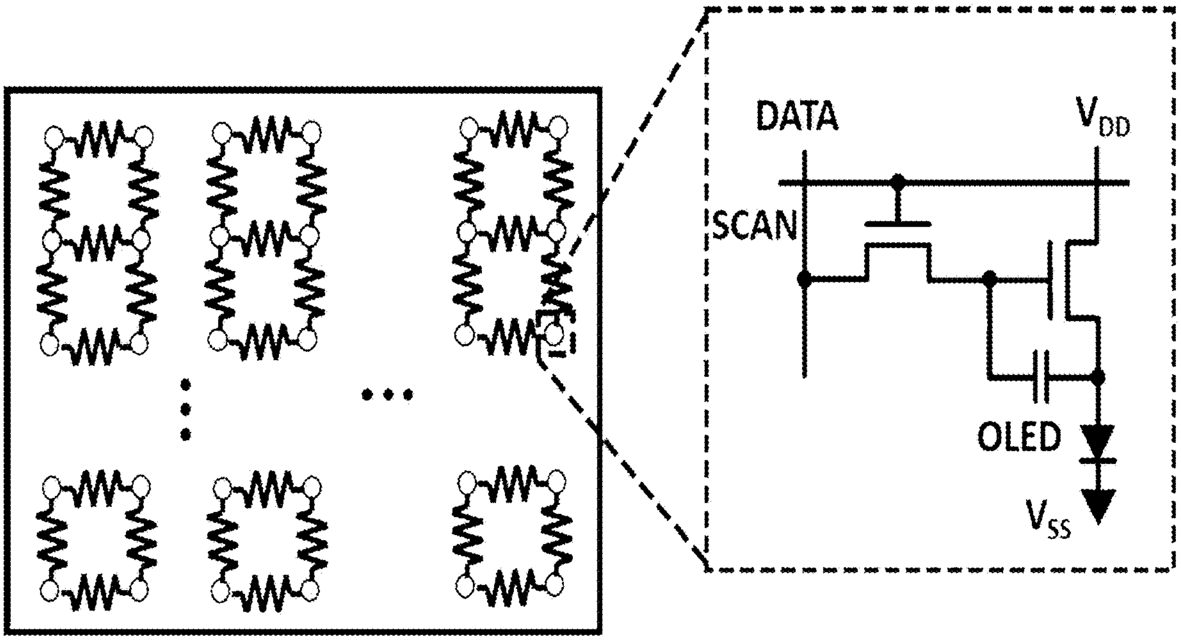
FIG. 1A is a diagram illustrating a conventional active matrix organic light-emitting diode (AMOLED) pixel circuit display panel.
Figure 1B:
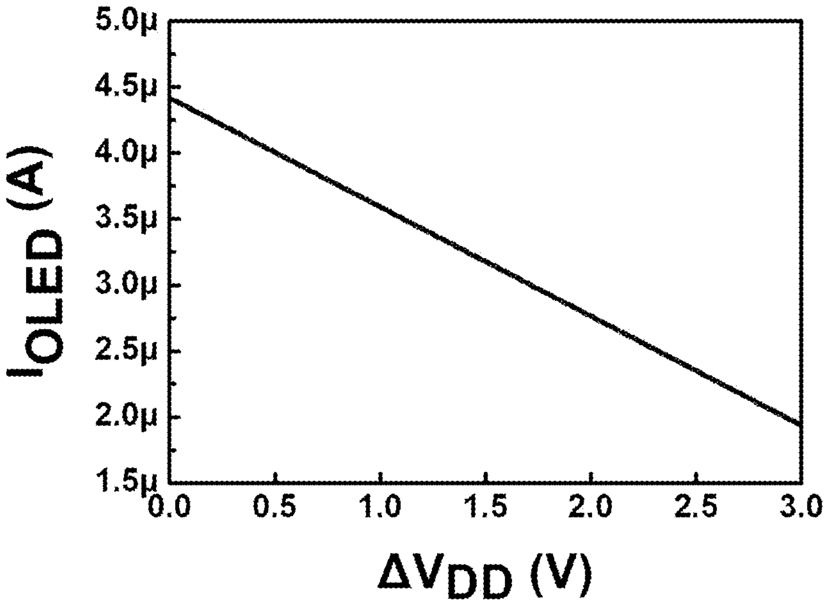
FIG. 1B is a diagram illustrating the resistance of the conventional AMOLED pixel circuit display panel.
Figure 2A:
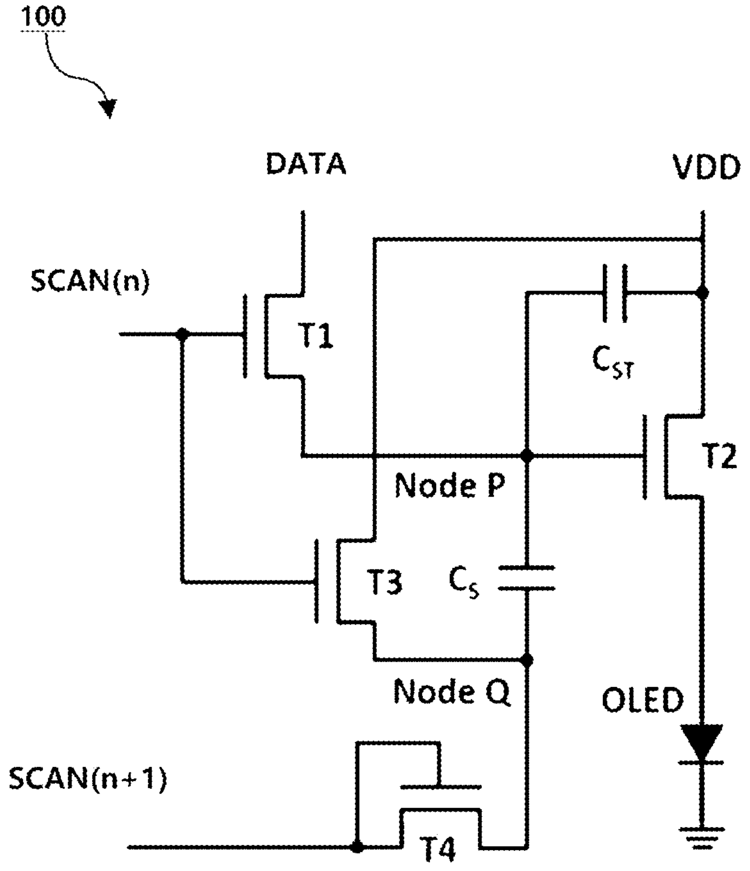
FIG. 2A is a circuit diagram of the AMOLED compensation pixel circuit according to the present invention.
Figure 2B:
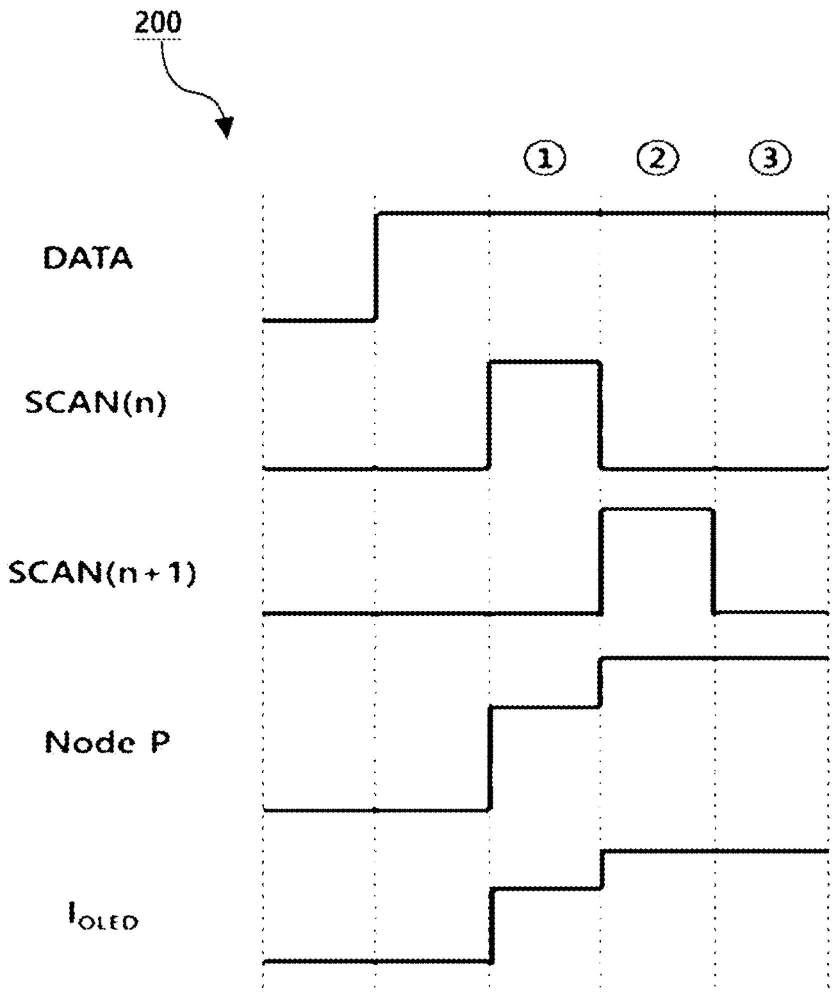
FIG. 2B is a timing diagram illustrating the operation of the AMOLED compensation pixel circuit of FIG. 2A.

FIG. 2A is a circuit diagram of the AMOLED compensation pixel circuit according to the present invention, and FIG. 2B is a timing diagram illustrating the operation of the AMOLED compensation pixel circuit of FIG. 2A.

As shown in FIG. 2A, the stretching compensation pixel circuit for an AMOLED according to an embodiment of the present invention includes an organic light-emitting diode (OLED) element, switching transistors T1, T3, and T4, a driving transistor T2, and capacitors $C_{ST}$ and $C_S$.

In FIG. 2A, the switching transistors T1, T3, and T4, as well as the driving transistor T2, are illustrated as N-type MOSFETs or N-channel thin-film transistors. However, the present invention is not limited to this, and it is also possible to implement them using P-type MOSFETs or thin-film transistors.

Referring to FIG. 2A, An AMOLED stretching compensation pixel circuit, according to one embodiment of the present invention, includes: an organic light-emitting diode (OLED) element that emits light with a predetermined luminance by a current supplied from an applied power voltage VDD; a first scan signal line SCAN(n) that serves as a power line for the power voltage and a signal line for a scan signal; a second scan signal line SCAN(n+1) that serves as a signal line for another scan signal; a first switching transistor T1 connected to a data line DATA that provides a data voltage for light emission of the OLED element; a driving transistor T2 whose gate electrode is connected to the source electrode of the first switching transistor T1 and whose drain electrode is applied with the power voltage VDD; a first capacitor $C_{ST}$ connected between the gate electrode and the drain electrode of the driving transistor T2; a stretching compensation second capacitor $C_S$ provided between a node serially connected to the source electrode of the first switching transistor T1 and the gate electrode of the driving transistor T2 and the first capacitor $C_{ST}$ and a node serially connected to a second switching transistor T3 and a third switching transistor T4; a second switching transistor T3 whose drain electrode is applied with the power voltage VDD and whose gate electrode is connected to the first scan signal line SCAN(n) together with the gate electrode of the first switching transistor T1; and, a third switching transistor T4 whose gate electrode and drain electrode are connected to each other to function as a diode and connected to the second scan signal line SCAN(n+1) and whose source electrode is connected to the source electrode of the second switching transistor T3.

Hereinafter, the operation of the AMOLED stretching compensation pixel circuit of the present invention will be described with reference to FIGS. 2A and 2B.

The first switching transistor T1 is turned on in accordance with the data pulse supplied from the first scan signal line SCAN(n) through the gate electrode, and can apply the data voltage VDATA coming from the data line DATA through the drain electrode to the gate electrode of the driving transistor T2, the first capacitor $C_{ST}$, and the second capacitor $C_S$.

In other words, the first switching transistor T1 operates according to the signal coming from the first scan signal line SCAN(n). Its drain electrode is connected to the data line DATA, which is connected to the data signal that determines the brightness. Its source electrode is connected to the gate electrode of the driving transistor T2, which controls the current flowing through the organic light-emitting diode element, as well as to the first capacitor $C_{ST}$ and the second capacitor $C_S$.

The driving transistor T2 is switched according to the data voltage VDATA supplied from the first switching transistor T1, and controls the current $I_{OLED}$ flowing through the organic light-emitting diode (OLED) element by the power supply voltage VDD. In this case, the drain electrode of the driving transistor T2 is connected to the power supply voltage VDD, and the source electrode is connected to the OLED element. The other terminal of the OLED element can be connected to the ground GND, or it can have a negative or positive voltage as needed.

The first capacitor $C_{ST}$, acting as a storage capacitor, is connected between the gate electrode and the drain electrode of the driving transistor T2. It stores a voltage corresponding to the data voltage (VDATA) supplied to the gate electrode of the driving transistor T2, and can turn on the driving transistor T2 with the stored voltage.

The OLED element is electrically connected to the source electrode of the driving transistor T2, and can emit light by the current supplied from the power supply voltage VDD.

The stretching compensation second capacitor $C_S$ is connected between Node P, where the source electrode of the first switching transistor T1 and the gate electrode of the driving transistor T2 meet, and the node between the source electrodes of the second switching transistor T3 and the third switching transistor T4. It is connected in series with the first capacitor $C_{ST}$. The stretching compensation second capacitor $C_S$, serving as a stretching capacitor, changes its capacitance according to the elongation of the length or area of the display panel.

The second switching transistor T3, along with the first switching transistor T1, is connected to the first scan signal line SCAN(n) and serves to charge the second capacitor $C_S$ with the power supply voltage VDD. The second switching transistor T3, acting as a charging transistor, has its source electrode connected to the connection point between the compensation capacitor $C_S$ and the source electrode of the third switching transistor T4, while its other electrode, the drain electrode, is connected to the power supply (VDD) line. Furthermore, its gate electrode is connected to the first scan signal line SCAN(n).

The third switching transistor T4 has its gate electrode and drain electrode connected to each other, functioning as a diode and allowing current to flow in only one direction. The source electrode of the third switching transistor T4 is connected to the source electrode of the second switching transistor T3, while its drain electrode and gate electrode are applied to the subsequent second scan signal line SCAN(n+1), serving as a path for charging the second capacitor $C_S$.

The stretching compensation pixel circuit for an AMOLED according to an embodiment of the present invention is developed as a single circuit considering the pixel array, and the circuit operates in three periods: Writing (210), Compensation (220), and Emission (230). The operation of each period will be described with reference to FIGS. 3A, 3B, 4A, 4B, 5A, and 5B, respectively.

Figure 3A:
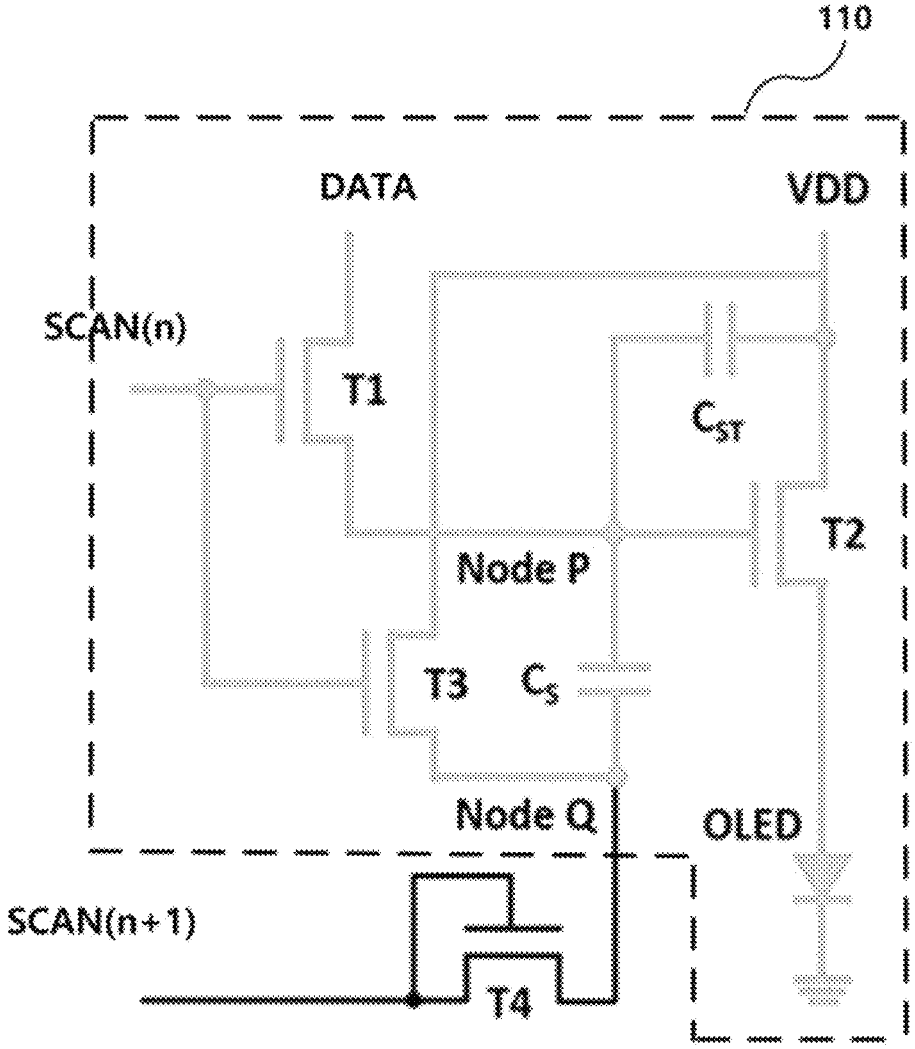
FIG. 3A is a circuit diagram of the AMOLED compensation pixel circuit according to the present invention during the writing period.
Figure 3B:
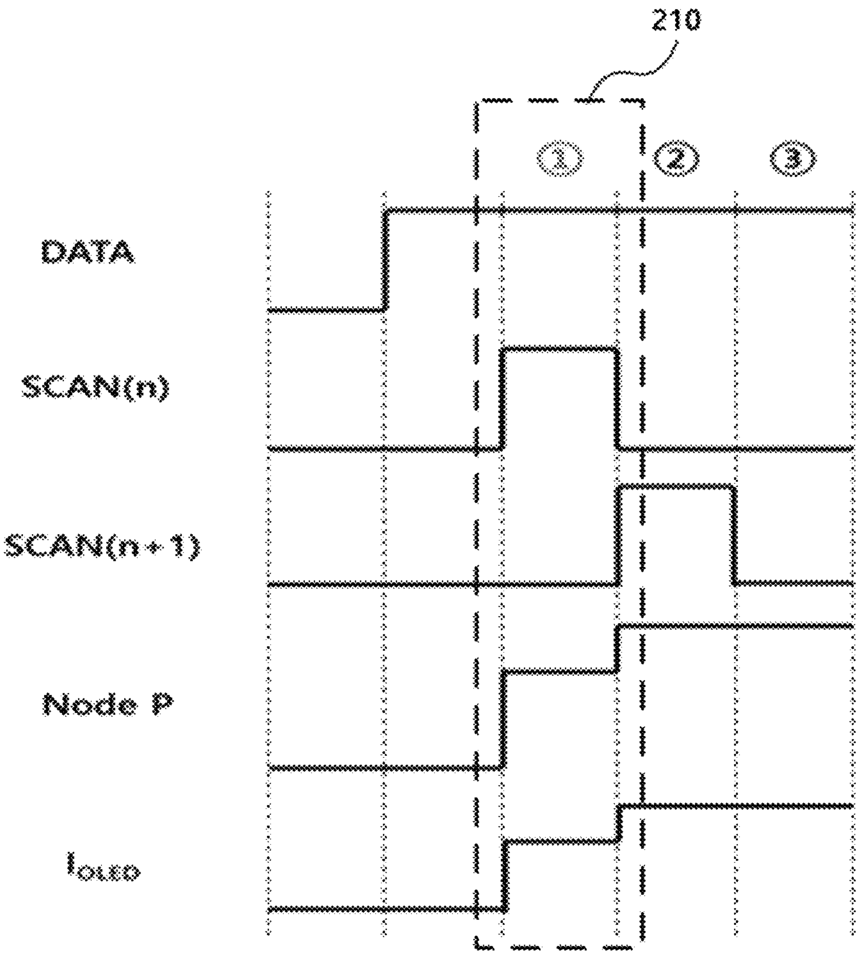
FIG. 3B is a timing diagram illustrating the operation of the writing period in FIG. 3A.

FIG. 3A is a circuit diagram of the AMOLED compensation pixel circuit according to the present invention during the writing period, and FIG. 3B is a timing diagram illustrating the operation of the writing period in FIG. 3A.

As shown in the Writing period (210), the first phase in FIGS. 3A and 3B, a data pulse is applied from the data line DATA in accordance with the pulse applied to the first scan signal line SCAN(n). At the same time, the first switching transistor T1 is turned on by the scan pulse applied from the first scan signal line SCAN(n), and the data voltage is stored at Node P by the first capacitor $C_{ST}$ and the second capacitor $C_S$. During this time, the second switching transistor T3 serves to charge the second capacitor $C_S$ with the power supply voltage VDD applied to its drain. The driving transistor T2 is also turned on, and current flows through the OLED due to the VDD power supply, causing it to emit light. However, this light emission is negligible as it occurs for a very short duration compared to a frame.

Figure 4A:
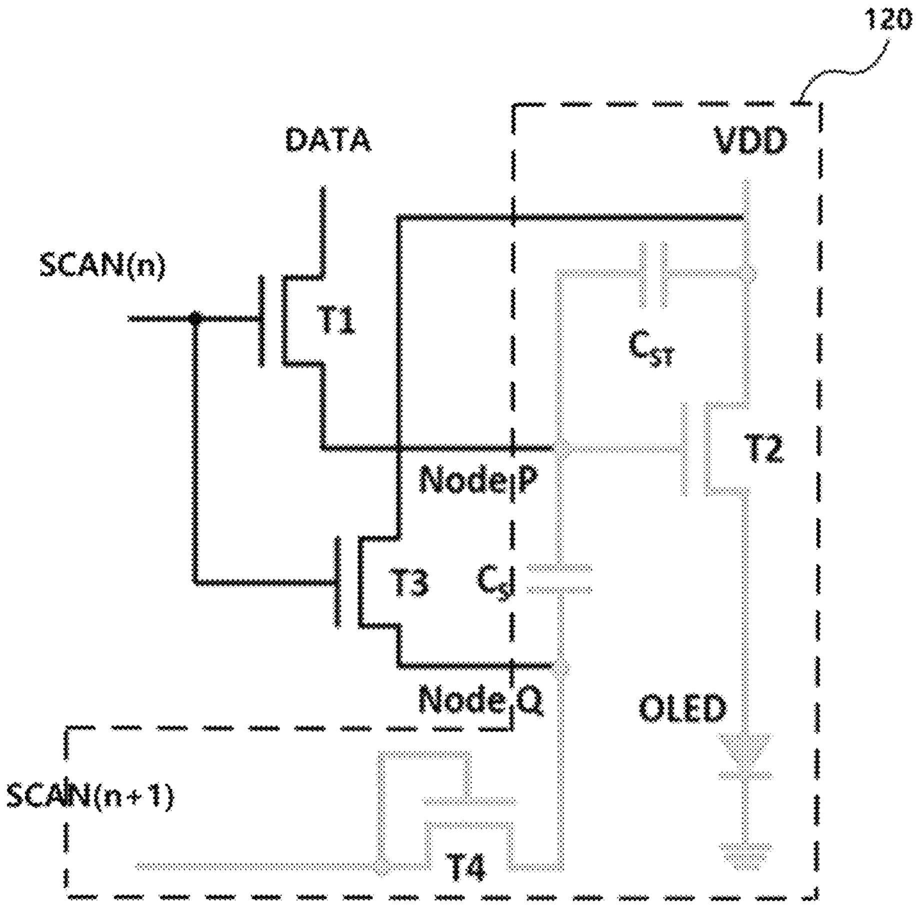
FIG. 4A is a circuit diagram of the AMOLED compensation pixel circuit according to the present invention during the compensation period.
Figure 4B:
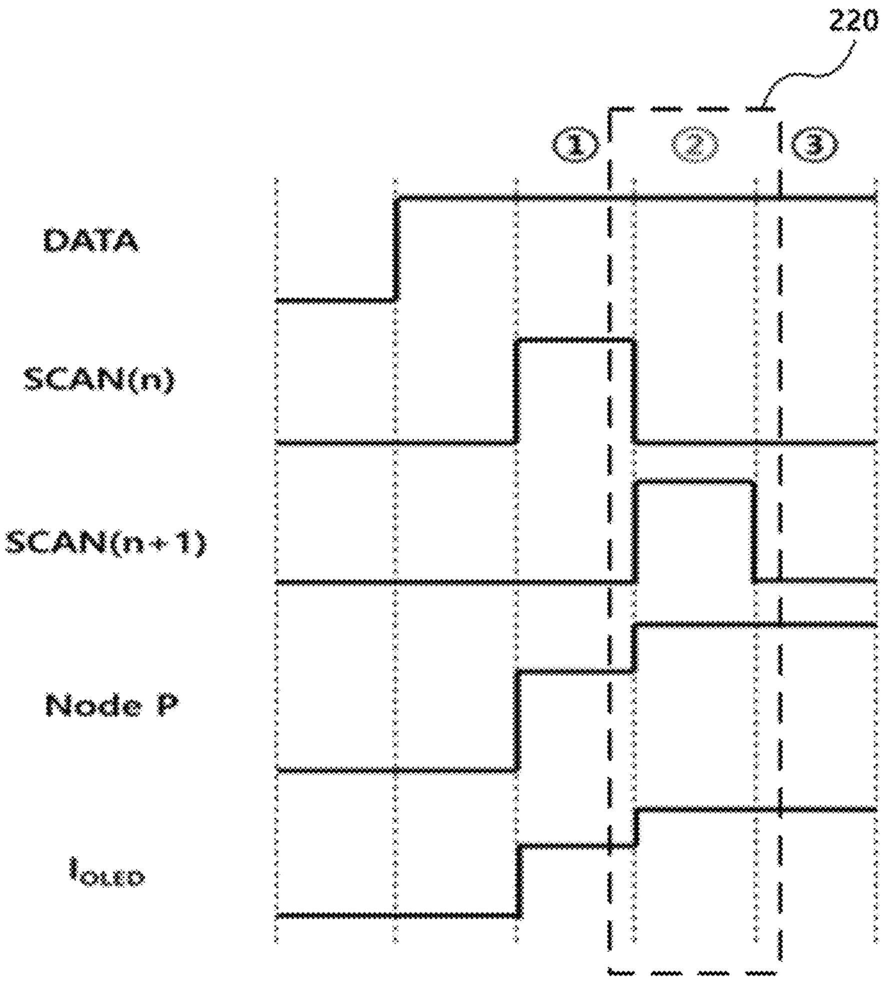
FIG. 4B is a timing diagram illustrating the operation of the compensation period in FIG. 4A.

FIG. 4A is a circuit diagram of the AMOLED compensation pixel circuit according to the present invention during the Compensation period, and FIG. 4B is a timing diagram illustrating the operation of the Compensation period in FIG. 4A.

As shown in the Compensation period (220), the second phase in FIGS. 4A and 4B, a scan pulse is applied from the second scan signal line SCAN(n+1), causing the third switching transistor T4 to remain on during this period. The voltage from the second scan signal line SCAN(n+1), entering through the third switching transistor T4, charges the second capacitor $C_S$. This increases the voltage at Node P, which is connected to the gate electrode of the driving transistor T2, thereby increasing the current of the driving transistor T2. The OLED also emits light during this phase, but similar to the Writing period (210), it's for a very short duration compared to a frame and thus negligible.

Figure 5A:
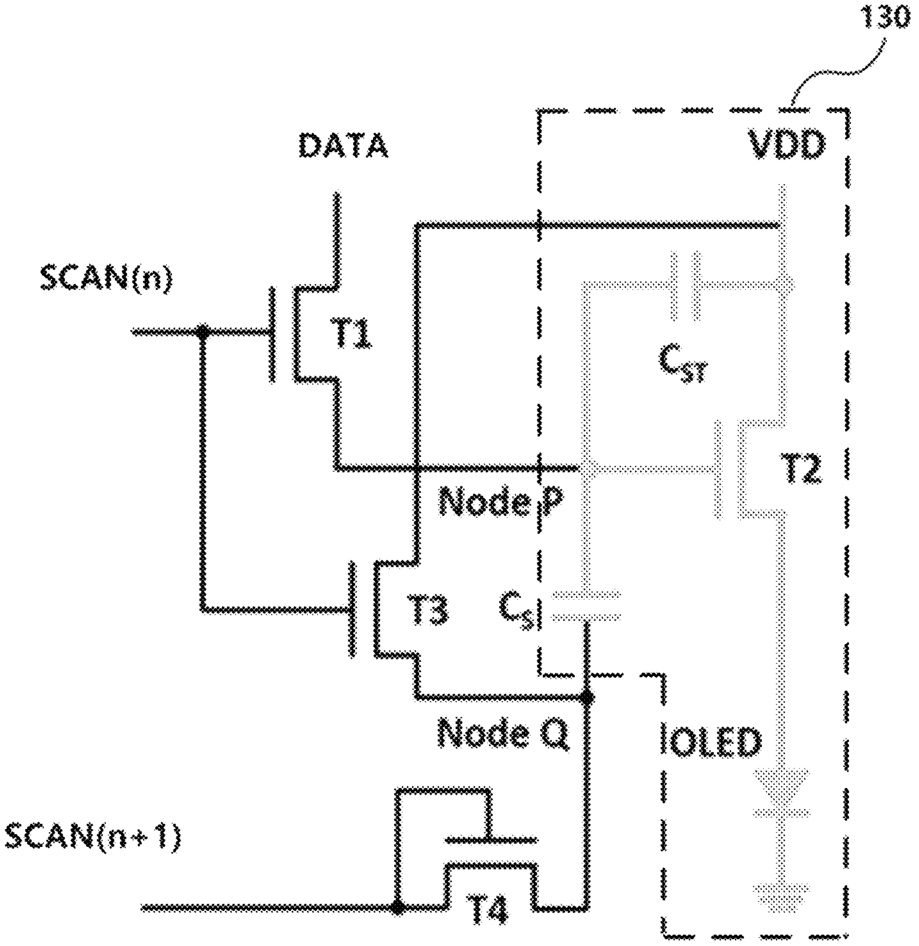
FIG. 5A is a circuit diagram of the AMOLED compensation pixel circuit according to the present invention during the emission period.
Figure 5B:
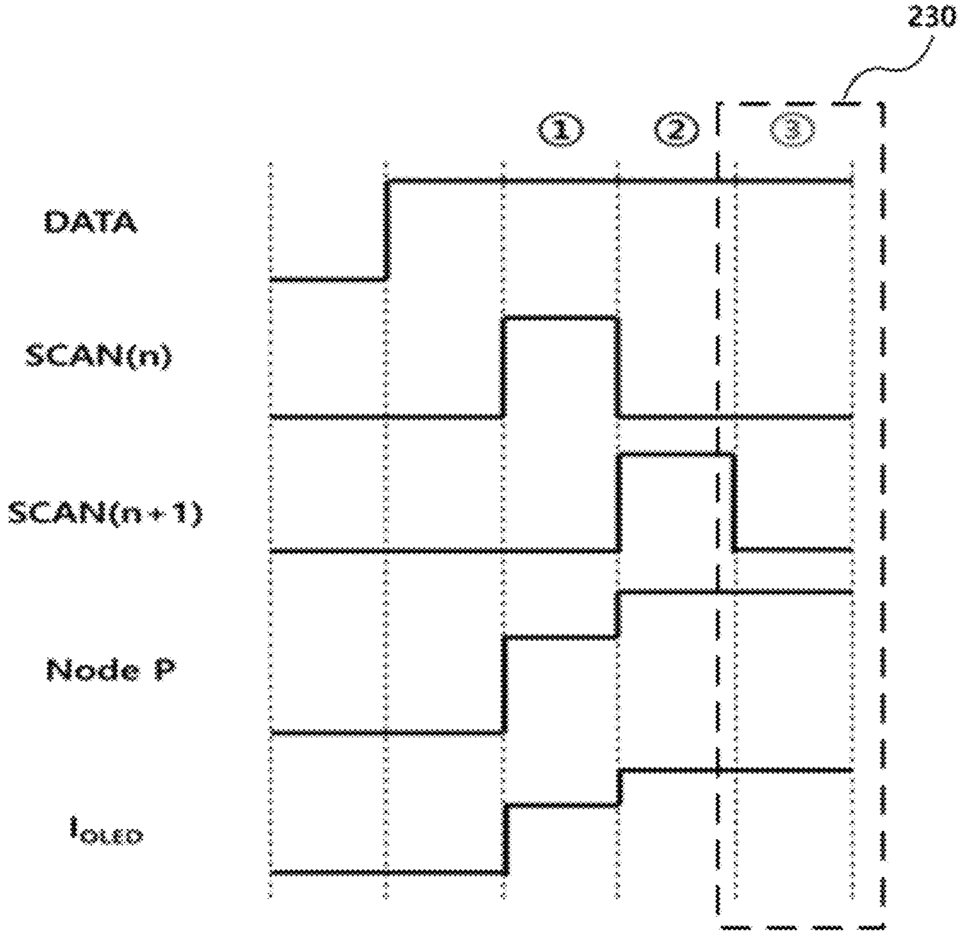
FIG. 5B is a timing diagram illustrating the operation of the emission period in FIG. 5A.

FIG. 5A is a circuit diagram of the AMOLED compensation pixel circuit according to the present invention during the Emission period, and FIG. 5B is a timing diagram illustrating the operation of the Emission period in FIG. 5A.

As shown in the Emission period (230), the third phase in FIGS. 5A and 5B, both scan signal lines become Low, turning off all TFTs except for the driving transistor T2. The driving transistor T2 is turned on by the voltage stored at Node P, allowing the power supply voltage VDD to be applied to the OLED.

Figure 6A:
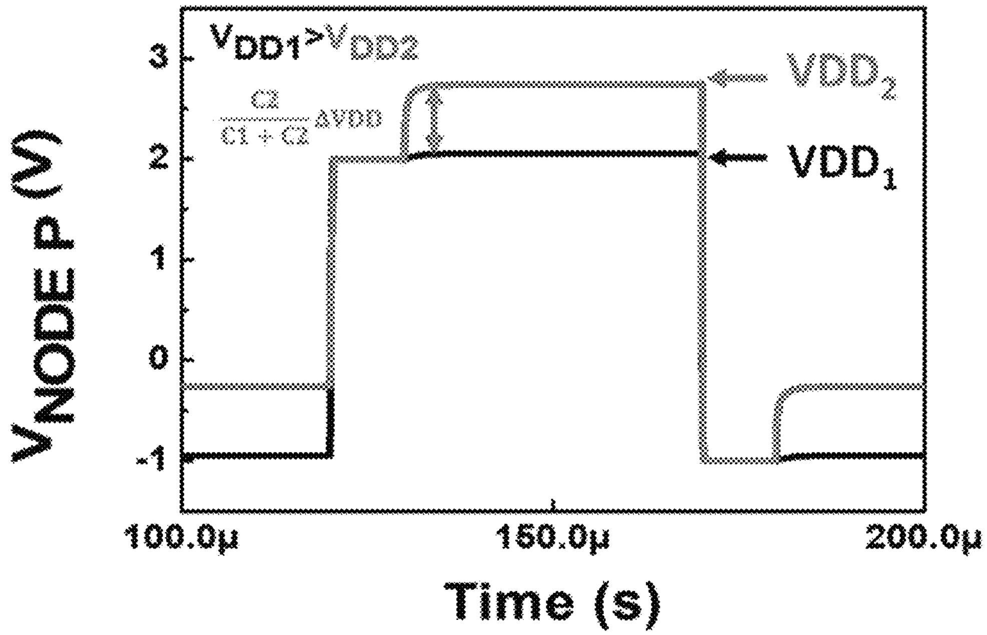
FIG. 6A is a graph illustrating the characteristics of the AMOLED compensation pixel circuit according to the present invention.
Figure 6B:
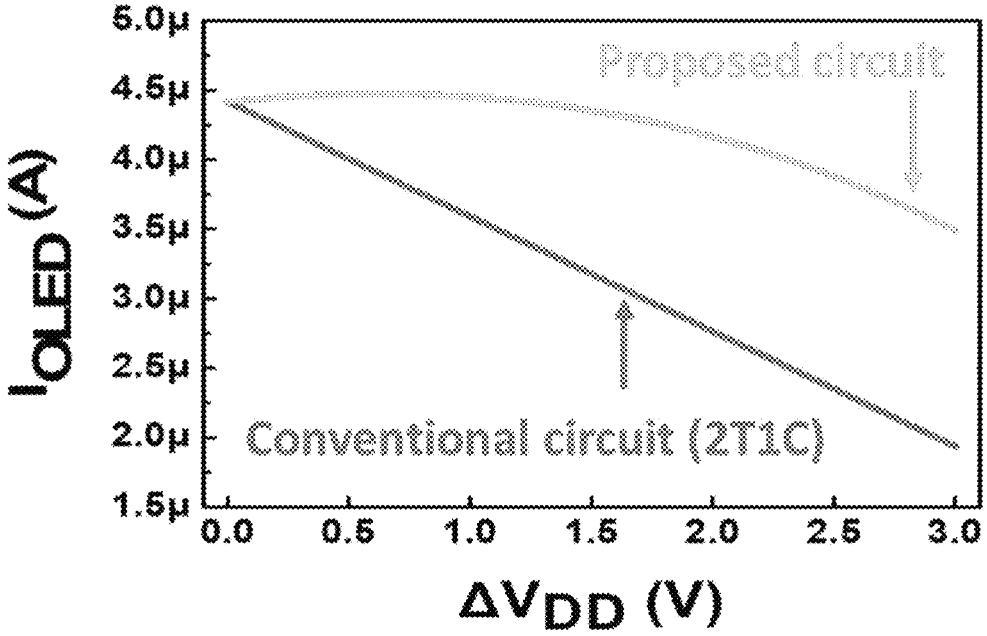
FIG. 6B is a graph illustrating the characteristics of the AMOLED compensation pixel circuit according to the present invention.

FIGS. 6A and 6B are graphs illustrating the characteristics of the AMOLED compensation pixel circuit according to the present invention.

As shown in FIG. 6A, when the power supply voltage VDD experiences a voltage drop from VDD1 to VDD2 due to an I-R drop, the following occurs: The voltage stored at Node Q becomes VDD2. When the voltage of SCAN (N+1) with a pulse voltage of VsH is applied, the Q point is charged to a voltage of VsH−Vth, and the voltage increase at the Q point is VsH−Vth−VDD2. In the case where there is no voltage drop, i.e., VDD=VDD1, the voltage increase at the Q point is VsH−Vth−VDD1. Consequently, the voltage at Node P undergoes bootstrapping, resulting in (VsH−Vth−VDD2)C2/(C1+C2) and (VsH−Vth−VDD1)C2/(C1+C2) of bootstrapping in each case, respectively. Therefore, when the voltage VDD drops to VDD2, the bootstrapping at Node P is greater than when the original voltage was VDD1, and the difference is (VDD1−VDD2)C2/(C1+C2), which is the difference between the two equations above. Thus, when the VDD voltage drops from VDD1 to VDD2, the voltage at Node P, i.e., the voltage VNODE P at the gate electrode of the driving transistor T2, increases by (C2/(C1+C2))ΔVDD. Here, ΔVDD represents the amount of decrease in VDD.

Therefore, even if the power supply voltage VDD decreases, the voltage at the gate electrode of the driving transistor T2 increases, compensating for the decrease in the current $I_{OLED}$ flowing to the OLED.

FIG. 6B compares the decrease in $I_{OLED}$ with decreasing VDD in a conventional pixel circuit and the proposed AMOLED compensation pixel circuit of the present invention. In the case of the present invention, the decrease in $I_{OLED}$ is compensated, showing a significantly gentler decrease. This mitigates the luminance reduction of the pixel circuit, leading to a more uniform luminance.

The above operation demonstrates the compensation effect due to the decrease in VDD while $C_S$ remains constant. As the panel stretches and $C_S$ increases, the voltage at Node P increases due to bootstrapping, increasing the OLED luminance and compensating for the luminance degradation caused by stretching, thus maintaining its original function. Therefore, the present invention can simultaneously compensate for the average luminance decrease caused by simple stretching and area increase, as well as the decrease caused by VDD reduction.

As shown above, although the present invention has been described by means of limited embodiments and drawings, the invention is not limited thereby and various modifications and variations can be made by one having ordinary knowledge in the technical field to which the invention belongs within the equitable scope of the technical idea of the invention and the claims of the patent which will be described below.

What is claimed is:

1. An active matrix organic light-emitting diode (AMOLED) compensation pixel circuit, comprising:

a power line for a power voltage;

an organic light-emitting diode element that emits light with a predetermined luminance by a supplied current;

a driving transistor, to which the power voltage is applied to a drain electrode through the power line, and wherein a current supplied by the applied power voltage is transmitted to a source electrode to deliver the current to the organic light-emitting diode element;

a first scan signal line that serves as a signal line for a scan signal;

a second scan signal line that serves as a signal line for another scan signal;

a data line that provides a data voltage for light emission of the organic light-emitting diode element;

a first switching transistor, whose gate electrode is connected to the first scan signal line, and whose drain electrode is connected to the data line;

a first capacitor connected between a gate electrode and the drain electrode of the driving transistor;

a second switching transistor, whose gate electrode is connected to the first scan signal line together with the gate electrode of the first switching transistor, and whose drain electrode is connected to a power line for the power voltage;

a third switching transistor, whose source electrode is connected to a source electrode of the second switching transistor, and whose gate electrode and drain electrode are connected to each other to function as a diode, allowing a unidirectional current to flow; and a second capacitor connected between a node (hereinafter, referred to as 'Node P') connected to a source electrode of the first switching transistor, the gate electrode of the driving transistor, and the first capacitor, and a node (hereinafter, referred to as 'Node Q') connected to the source electrode of the second switching transistor and the source electrode of a third switching transistor.

2. The active matrix organic light-emitting diode (AMOLED) compensation pixel circuit of claim 1, wherein:

the first switching transistor turns on in response to a scan pulse supplied from the first scan signal line through the gate electrode to apply the data voltage transmitted from the data line to the gate electrode of the driving transistor, the first capacitor, and the second capacitor.

3. The active matrix organic light-emitting diode (AMOLED) compensation pixel circuit of claim 1, wherein:

the drain electrode of the first switching transistor is connected to the data line, which is connected to a data signal that determines brightness, and the source electrode of the first switching transistor is connected to the gate electrode of the driving transistor, which controls the current flowing through the organic light-emitting diode element, the first capacitor, and the second capacitor.

4. The active matrix organic light-emitting diode (AMOLED) compensation pixel circuit of claim 1, wherein:

the driving transistor controls a current flowing to the organic light-emitting diode element by controlling the current according to the data voltage supplied to the gate electrode from the first switching transistor.

5. The active matrix organic light-emitting diode (AMOLED) compensation pixel circuit of claim 1, wherein:

the drain electrode of the third switching transistor is connected to the second scan line to perform a role of a path for charging a voltage to the second capacitor.

6. The active matrix organic light-emitting diode (AMOLED) compensation pixel circuit of claim 1, wherein:

the first capacitor is connected between the gate electrode and the drain electrode of the driving transistor to store a voltage corresponding to the data voltage supplied to the gate electrode of the driving transistor and to turn on the driving transistor with the stored voltage.

7. The active matrix organic light-emitting diode (AMOLED) compensation pixel circuit of claim 1, wherein:

the second capacitor is a stretching compensation capacitor, whose capacitance changes according to the length or area stretching of the panel.

8. The active matrix organic light-emitting diode (AMOLED) compensation pixel circuit of claim 1, wherein:

the other end of the organic light-emitting diode element is grounded or has a negative voltage or a positive voltage.

9. The active matrix organic light-emitting diode (AMOLED) compensation pixel circuit of claim 1, wherein:

the second switching transistor is connected to the first scan signal line together with the first switching transistor to charge the second capacitor with the power voltage applied to the drain electrode.

10. The active matrix organic light-emitting diode (AMOLED) compensation pixel circuit of claim 1, wherein:

the second switching transistor is a charging transistor, whose source electrode is connected to a connection part of the second capacitor for compensation and the source electrode of the third switching transistor, and whose drain electrode is connected to the power line.

11. The active matrix organic light-emitting diode (AMOLED) compensation pixel circuit of claim 1, wherein:

the first capacitor is a storage capacitor.

* * * * *